US007889677B1

(12) United States Patent
Foldvik

(10) Patent No.: US 7,889,677 B1
(45) Date of Patent: Feb. 15, 2011

(54) SS7 NETWORK PLANNING AND FORECASTING TOOL

(75) Inventor: Randolph G. Foldvik, Kirkland, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 518 days.

(21) Appl. No.: 11/554,422

(22) Filed: Oct. 30, 2006

(51) Int. Cl.
*H04L 12/28* (2006.01)
*G06F 15/173* (2006.01)

(52) U.S. Cl. .................. 370/254; 370/255; 709/224; 709/226

(58) Field of Classification Search .............. 370/354, 370/400, 401, 410; 718/104
See application file for complete search history.

(56) References Cited

U.S. PATENT DOCUMENTS

| | | | | |
|---|---|---|---|---|
| 6,163,602 A | * | 12/2000 | Hammond et al. | 379/114.01 |
| 6,421,435 B1 | * | 7/2002 | Bastien et al. | 379/133 |
| 6,628,622 B1 | * | 9/2003 | Bulick et al. | 370/254 |
| 6,802,044 B2 | * | 10/2004 | Campbell et al. | 716/2 |
| 6,958,979 B2 | * | 10/2005 | Bulick et al. | 370/254 |
| 7,492,775 B2 | * | 2/2009 | Cannon et al. | 370/401 |
| 7,814,206 B1 | * | 10/2010 | Foldvik et al. | 709/226 |
| 2001/0028706 A1 | * | 10/2001 | Nolting | 379/134 |
| 2001/0038689 A1 | * | 11/2001 | Liljestrand et al. | 379/201.03 |
| 2002/0162059 A1 | * | 10/2002 | McNeely et al. | 714/703 |
| 2003/0002489 A1 | * | 1/2003 | Bulick et al. | 370/354 |
| 2004/0181794 A1 | * | 9/2004 | Coleman et al. | 718/104 |
| 2005/0047401 A1 | * | 3/2005 | Garnero et al. | 370/353 |
| 2005/0132027 A1 | * | 6/2005 | Vicente et al. | 709/220 |
| 2006/0067503 A1 | * | 3/2006 | Caugherty et al. | 379/221.07 |
| 2006/0233101 A1 | | 10/2006 | Luft et al. | |
| 2007/0094381 A1 | * | 4/2007 | Weiss et al. | 709/224 |

* cited by examiner

*Primary Examiner*—Jayanti K Patel
*Assistant Examiner*—Christopher T Wyllie
(74) *Attorney, Agent, or Firm*—Parks IP Law LLC; Jonathan A. Paulis

(57) ABSTRACT

A Signaling System 7 (SS7) tool for planning an SS7 network having a plurality of network elements is provided herein. The SS7 tool is configured to obtain current traffic data from the SS7 network and determine a current peak utilization of each of the network elements based upon the traffic data. The SS7 tool is further configured to obtain pending reconfiguration plan data and to determine a preliminary reconfiguration based upon the reconfiguration plan data. The SS7 tool also obtains subscriber load data to forecast future peak utilization of the SS7 network by determining for each of the network elements, the impact of at least one of the following: the subscriber load data, the reconfiguration plan data for that element, and an element status. The SS7 tool then automatically recommends a reconfiguration of the network based upon said forecasted peak utilization.

9 Claims, 4 Drawing Sheets

SS7 NETWORK PLANNING AND FORECASTING TOOL

TECHNICAL FIELD

The present invention relates generally to planning communications networks and, more particularly, to a Signaling System 7 (SS7) network planning and forecasting tool.

BACKGROUND OF THE INVENTION

An SS7 network is a packet data network used for out-of-band signaling to perform call-establishment, call-termination, billing, and routing functions; to implement Advanced Intelligent Network (AIN) services; and to provide database access for services such as toll-free calling, toll calling, Line Number Portability (LNP), and Line Information Database (LIDB). Core components of the SS7 network include packet switches called Signal Transfer Points (STPs), telephone switches (end offices or tandems) called Signal Switching Points (SSPs), and databases called Signal Control Points (SCPs). These components facilitate the various functions of an SS7 network.

Typically, an SS7 network consists of hundreds of interconnected platforms and thousands of associated links. Accordingly, it is difficult to track the current network configuration and further difficulty arises with the increasing need to plan for future network configurations, taking into account, for example, current and future signaling link loads, the impact of pending network configuration changes, and the reconfigurations required to support growing subscriber loads.

Traditionally, SS7 network planning has been manually accomplished through the use of spreadsheets. The capacity of this type of planning is often limited to a portion of the SS7 network, making it difficult to accurately plan and forecast future needs of the SS7 network.

More recently, software tools have been developed that utilize a Graphical User Interface (GUI) to guide a user through the development of an alternative network design. The GUI provides the user with an image of the network and allows the user to graphically select network components for modification. These tools determine equipment capacity exhaustion due to maximum load forecasts for specified study periods and the costs for the alternative network.

These software tools, however, do not provide forecasting capabilities with regard to forecasted future voice traffic loads. Moreover, these tools do not recommend reconfigurations to existing signaling links to resolve forecasted link overload situations or otherwise assist a user with routine planning for future modifications and/or the respective effects on various aspects of the SS7 network.

Thus, what is needed is an SS7 network planning and forecasting tool that provides greater capabilities than existing SS7 network planning tools. The tool should accept a number of inputs corresponding to a current SS7 network configuration, any pending reconfigurations, and future reconfigurations, while taking into account utilization parameters for the various signaling links, any static or declining signaling links, and forecasted link loads. Further, the tool should provide both near-term tactical and long-term strategic advice with regard to a specified planning period. Still further, the tool should offer a GUI to guide the user through the manipulation of various inputs and provide the user with several views of the current network configuration and future network configurations based upon recommendations provided by the tool, and the respective outputs.

SUMMARY OF THE INVENTION

The various embodiments of the present invention overcome the shortcomings of the prior art by providing systems, methods, and computer program products to forecast and plan SS7 networks. In one embodiment, a system for forecasting and planning an SS7 network includes at least one input/output (I/O) device configured to obtain current traffic data, reconfiguration plan data, subscriber load data, and element status data from the SS7 network and a number of input tables. The system also includes a processor that is in communication with the I/O device and configured to determine current peak utilization of at least one network element based upon the traffic data, and determine a preliminary network reconfiguration based upon the reconfiguration plan data. The processor is further configured to forecast future utilization of the SS7 network by determining for the network element(s), the impact of at least one of the following: the subscriber load data, the reconfiguration data, and the link status data. The processor then recommends a network reconfiguration of the SS7 network based upon the forecasted utilization. The system also includes a memory that is in communication with the processor. The memory is configured to store the data.

A method for forecasting and planning an SS7 network is also provided. In one embodiment, the method obtains current traffic data, pending reconfiguration plan data, and subscriber load data from the SS7 network. This data is used to determine current utilization of the network element(s) based upon the traffic data and to determine a preliminary network reconfiguration based upon the reconfiguration plan data. The method also forecasts future utilization of the SS7 network by determining for each of the network elements, the impact of at least one of the following: the subscriber load data, the reconfiguration plan data for each element, and an element status. The element status indicates whether each of the network elements is in a static or declining state. The forecasted utilization is used to recommend a network reconfiguration of the network based upon the forecasted utilization. Computer program products can be developed to perform the steps of the abovementioned method.

The foregoing has broadly outlined some of the aspects and features of the present invention, which should be construed to be merely illustrative of various potential applications of the invention. Other beneficial results can be obtained by applying the disclosed information in a different manner or by combining various aspects of the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

DETAILED DESCRIPTION OF THE INVENTION

As required, detailed embodiments of the present invention are disclosed herein. It must be understood that the disclosed embodiments are merely exemplary of the invention that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

Figure 1:
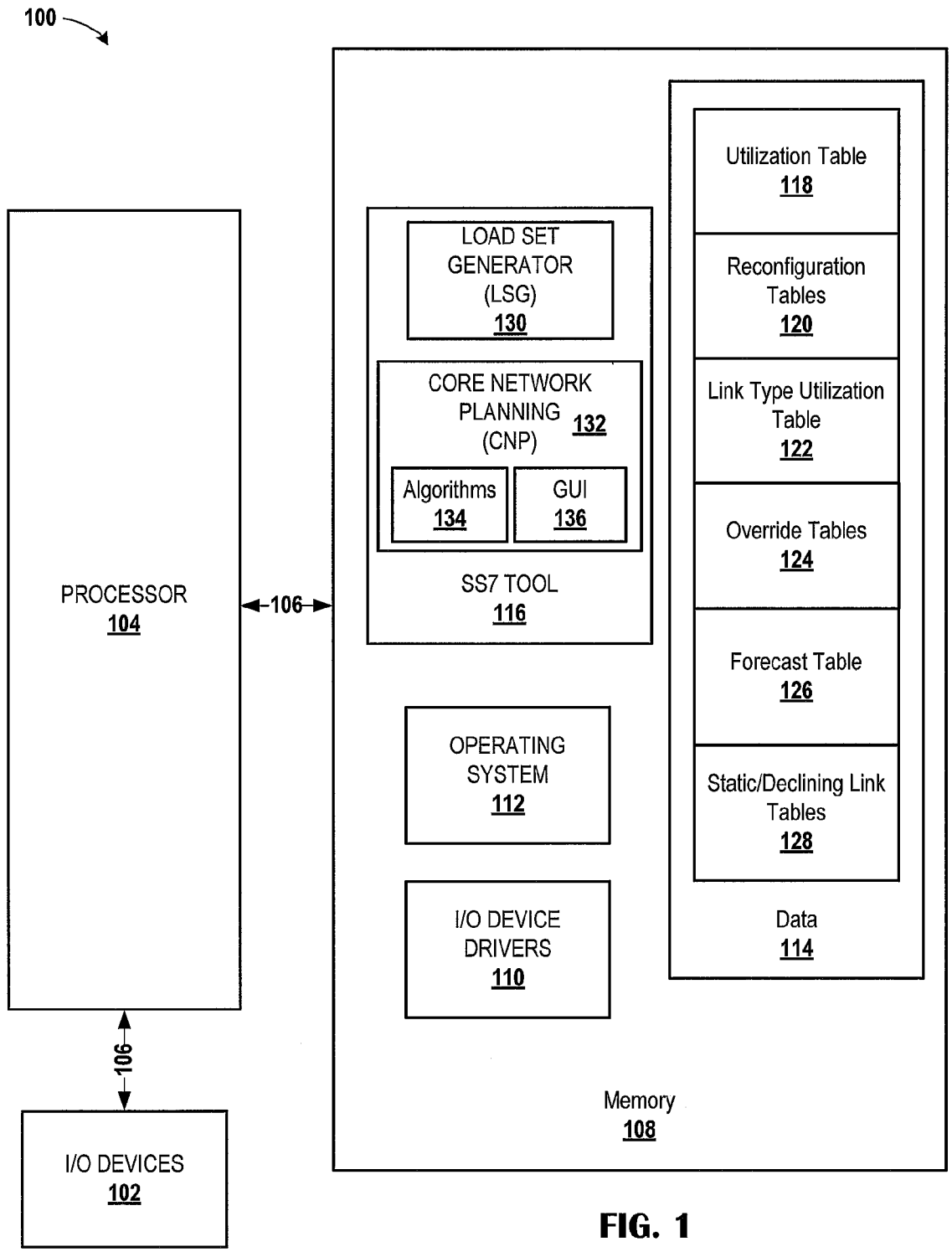
FIG. 1 illustrates an exemplary data processing system in accordance with various aspects of the present invention.

Referring now to the drawings in which like numerals represent like elements throughout the several views, FIG. 1 illustrates an exemplary data processing system 100. The data processing system 100 provides an interface between a user and the present invention. As such, the illustrated data processing system 100 includes input/output (I/O) devices 102 that are operatively linked and in communication with a processor 104 via a data/memory bus 106. The I/O devices 102 can include, but are not limited to, a display, a keyboard, a pointing device, or other data entry and selection tools as are known in the art. The processor 104 is operatively linked and in communication with a memory 108 via the data/memory bus 106.

The memory 108 collectively refers to all memory types associated with the data processing system 100 such as, but not limited to, processor registers, processor cache, random access memory (RAM), other volatile memory forms, and non-volatile, semi-permanent or permanent memory types; for example, tape-based media, optical media, flash media, hard disks, combinations thereof, and the like. Moreover, the memory 108 is intended to encompass network memory and/or other storage devices in wired or wireless communication with the data processing system 100, which may utilize one or more I/O devices 102 to facilitate such communication. Thus, any of the data and software described below can be stored within memory 108 and/or accessed via network connections to other data processing systems (not shown) that may comprise a local area network (LAN), a metropolitan area network (MAN), a wide area network (WAN), portions and/or combinations thereof, and the like. Accordingly, the present invention may operate on the data processing system 100, wherein the data processing system 100 is configured as a server to one or more client data processing systems as dictated by a client/server model.

The illustrated memory 108 includes I/O device drivers 110 to facilitate communication between the I/O devices 102 and the other components of the data processing system 100. The memory 108 also includes an operating system 112, data 114, and a Signaling System 7 (SS7) tool 116.

The operating system 112 can be any type known to those skilled in the art. The illustrated data 114 includes a number of input tables, namely, a utilization table 118, reconfiguration tables 120, link type utilization table 122, override tables 124, forecast table 126, and a static/declining link tables 128. In general, the SS7 tool 116 receives the input tables and uses the data provided therein to recommend a reconfiguration of an SS7 network. The input tables are described below in detail.

SS7 Tool Input Tables

The utilization table 118 is provided as a primary input to the SS7 tool 116. The SS7 tool 116 uses the utilization table 118 to determine the current network configuration. It is contemplated that the utilization table can be updated by a user of the SS7 tool 116 and/or automatically in real-time, close to real-time, or at intervals prior to or during use of the SS7 tool 116. The utilization table 118 includes data pertinent to each link in an SS7 network, such as end points, point codes, common language location identifier (CLLI) codes, linkset associations, link types, link subtypes, utilization parameters, and peak utilization percentages over a specified period of time. Peak is defined herein to include a maximum utilization value and optionally a safety factor to increase or decrease the effective peak defined for each link in the network. As used herein, link types refer to A, B, C, D, and E links and link subtypes refer to low-speed links (LSLs), high-speed links (HSLs), and Internet Protocol (IP) links.

This data can be acquired via various modules, devices, or systems, and stored, for example, in associated databases. This data can be subsequently provided to the data processing system 100, wherein the utilization table 118 can be generated. Alternatively, the utilization table 118 may be generated by another data processing system such as a personal computer, workstation, or server. In case of the latter example, the utilization table 118 can then be transmitted to the data processing system 100 for further processing by the SS7 tool 116. Utilization table 118 data can also be entered manually.

The reconfiguration tables 120 generally provide data regarding any pending plans to reconfigure an SS7 network. As used herein, reconfiguration refers to at least one of the following: deleting, replacing, modifying or rehoming at least one of network element, or adding a new network element. The reconfiguration tables 120 can be generated manually. Alternatively, the reconfiguration tables 120 may be generated by an output of the SS7 tool 116, another tool, module, device, or system. For example, the SS7 tool 116 can recommend one or more manipulations of the network elements, which may update to a reconfiguration table 120 for input to the SS7 tool 116 during a future session. The SS7 tool 116 uses the reconfiguration tables 120 to reconfigure an SS7 network based upon pending plans such that recommendations for network manipulations can be made based upon the pending reconfiguration plans and not the current network configuration. It is contemplated, however, that the SS7 tool 116 can provide recommendations without regard to the reconfiguration plan data. It is further contemplated that alternative recommendations can be provided if, for example, the pending plan is only partially completed. Various exemplary reconfiguration table types are now described.

A new Signal Transfer Point (STP) pair table and a deleted STP pair table are provided to define current knowledge of future plans to add or delete STP pairs from the SS7 network. The new STP pair table can include data entry fields for the STP pair name, individual STP names, the date the STP pair will be added, and associated C link information such as link subtype, link quantity, and initial load; and associated STP pair information such as associated STP pair name and B/D link information such as link subtype, link quantity, and initial load. Conversely, the deleted STP pair table can include data entry fields for the STP pair name, individual STP names, and the date the STP pair will be deleted.

A new equipment node table and a deleted equipment node table are also provided. These tables define current knowledge of future plans to add or delete equipment nodes from the SS7 network. The new equipment node table can include data entry fields for the new equipment node such as node name, node point code, node CLLI, and date to be added. The new equipment node table can further include data entry fields for planned connections to STP pairs, and associated A link information such as link subtype, link quantity, and link load. Still further, the new equipment node table includes data entry fields for one or more existing nodes that are planned to offload a percentage of their load to the new equipment node. These data entry fields can include node name, node point code, and node CLLI. Conversely, the deleted equipment node table can include data entry fields for the deleted equipment node such as node name, node point code, node CLLI, and the date the node will be deleted. In addition, the deleted node table can include data entry fields for one or more nodes to which the deleted nodes load will be offloaded. These data entry fields can include node name, node point code, and node CLLI.

An equipment node rehome table is provided to define current knowledge of future plans to rehome equipment nodes. The equipment node rehome table includes data entry fields corresponding to the name of the node that will be rehomed and connectivity information such as name of the old STP pair, name of the new STP pair, and A link information such as subtype and quantity.

Yet another reconfiguration table is configured to define current knowledge of future plans to add, delete, upgrade, or otherwise manipulate existing A links. This table includes data entry fields such as the name, point code, CLLI, and target change date of the affected node. Link-specific information such as A link subtype, an indication as to whether the manipulation is a change or an upgrade, and the number of links affected per STP is also provided.

Another reconfiguration table is configured to define current knowledge of future plans to add, delete, upgrade, or otherwise manipulate existing B, C, and D links. This table includes data entry fields such as the name of the affected STP pair, the target change date, the type of the link being changed, the subtype of the link being changed, the name of the partner STP pair, an indication as to whether the manipulation is a change or an upgrade, the new link type, the new link subtype, and the number of links added or deleted from the existing STP pair.

Still another reconfiguration table is configured to define current knowledge of future plans to eliminate E links and transfer their associated loads to existing A links. This table includes data entry fields such as the name, point code, and CLLI of the affected node, and the date the E links will be eliminated.

Data corresponding to each of the foregoing reconfiguration tables 120 can be entered by a user. Alternatively, the data can be acquired via modules, device, or systems configured to collect and store such data.

Although specific reconfiguration tables 120 have been provided above, it is contemplated that other reconfiguration tables containing additional and/or alternative data can be included as is necessary for various implementations of the present invention. The link type utilization table 122, the override tables 124, the forecast table 126, and the static/declining link tables 128 are described below in detail.

The link type utilization table 122 is provided as an input to the SS7 tool 116 to define the link types, link subtypes, and maximum allowable percentage utilization for each link type and link subtype combination. These utilization parameters are used, in part, to provide a recommendation to reconfigure the SS7 network.

The override tables 124 are provided as an input to the SS7 tool 116 to selectively override the maximum allowable percentage utilization for specific link types/subtypes associated with specific equipment nodes and specific STP pairs. Data entry fields for a node-centric override table include node name, node point code, node CLLI, link type, link subtype, and revised maximum allowable percentage utilization. Data entry fields for an STP-centric override table include STP pair name, link type, link subtype, and revised maximum allowable percentage utilization.

A feature of the SS7 tool 116 is the ability to recommend a network reconfiguration based upon forecasted link load. A forecasted link load can be determined using trending logic that accounts for past and present subscriber loads and corresponding link loads. The trending logic should be consistent with the characteristics of the network. Network growth trends with regard to subscriber load and signaling link load can be used to determine a best fit for a given network. In one embodiment, the total forecasted subscriber load is trended in direct relation to the future link load such that if the total forecasted subscriber load is predicted to increase by X %, then the associated link load will also increase by X %. The subscriber forecast can be provided by modules, devices, systems, and/or databases configured to collect and store such data.

Selected links may be exempt from the above-described trending logic. For such links, a static/declining link table 128 is provided. The static/declining link table 128 defines a list of links that will experience either static or declining usage for the duration of a specified forecasting period. The static/declining links table 128 includes data entry fields for the node point code, a node description, and a percentage reduction which can be made, for example, weekly, monthly, or yearly. The average utilization of an affected node will be decremented by the percentage reduction for the specified time interval. In addition, the number of links will be decremented accordingly whenever the declining percentage utilization drops below a specified percentage of the maximum utilization percentage (as defined in the link type utilization table 122) for the specific link type. Link counts are decremented per established rules for each link type.

SS7 Tool Components

The illustrated SS7 tool 116 includes a load set generator (LSG) 130 and a core network planning (CNP) component 132. The LSG 130 is configured to perform various verification processes to, for example, confirm the presence of each input, identify potential logical inconsistencies with the data, and flag any errors or anomalies present in the inputs. Moreover, the LSG 130 is configured to parse the utilization table 118 and to aggregate all the input into a corresponding loadset. The loadset is provided to the CNP component 132 to load or create a project. The CNP component 132 includes algorithms 134 for recommending a reconfiguration of the SS7 network, and a graphical user interface (GUI) 136. Alternatively, the functions of these components are combined.

The GUI 136 allows a user to load a project based upon a given set of input tables. These input tables are provided to the CNP 132 in a loadset. Once loaded, the input tables can be viewed by the user and optionally modified, for example, during what-if analyses of various network configurations. The GUI 136 provides access to algorithms 134 so that the user may run the algorithms to obtain results of the modifications performed during these iterative analyses. The GUI 136 can include an option so that the user may view the network configuration at past, present, or future dates or time periods.

The GUI 136 also allows the user to view the triggers that prompted action to be taken by the SS7 tool 116. Triggers can be provided for static or declining links, utilization percentages that exceed specified utilization parameters, and actions taken due to a trigger on an associated link. In addition or alternatively, these outputs can be exported to an external file or another tool for additional analysis.

The GUI 136 also provides for easy interpretation of the network configuration data through the use of multiple view and organization options. Exemplary views include, but are not limited to, a number of overall SS7 network views, each with increasing granularity, link type views for displaying A, B, C, D, and E links individually or in any combination, and trigger views that are specific to the network as a whole or to specific link types. The ability to organize and display the network configuration data allows a user to step through a variety of views, each with increasing precision such that the user can ultimately view loading issues for specific links. Key links, such as those with trigger issues, can be displayed in a manner so as to stand out from the surrounding links.

Graphs can also be provided for specific links. These graphs, for example, can show the percentage utilization of a link over time and the number of links assigned over time. Other applicable graph types are contemplated.

Figure 2:
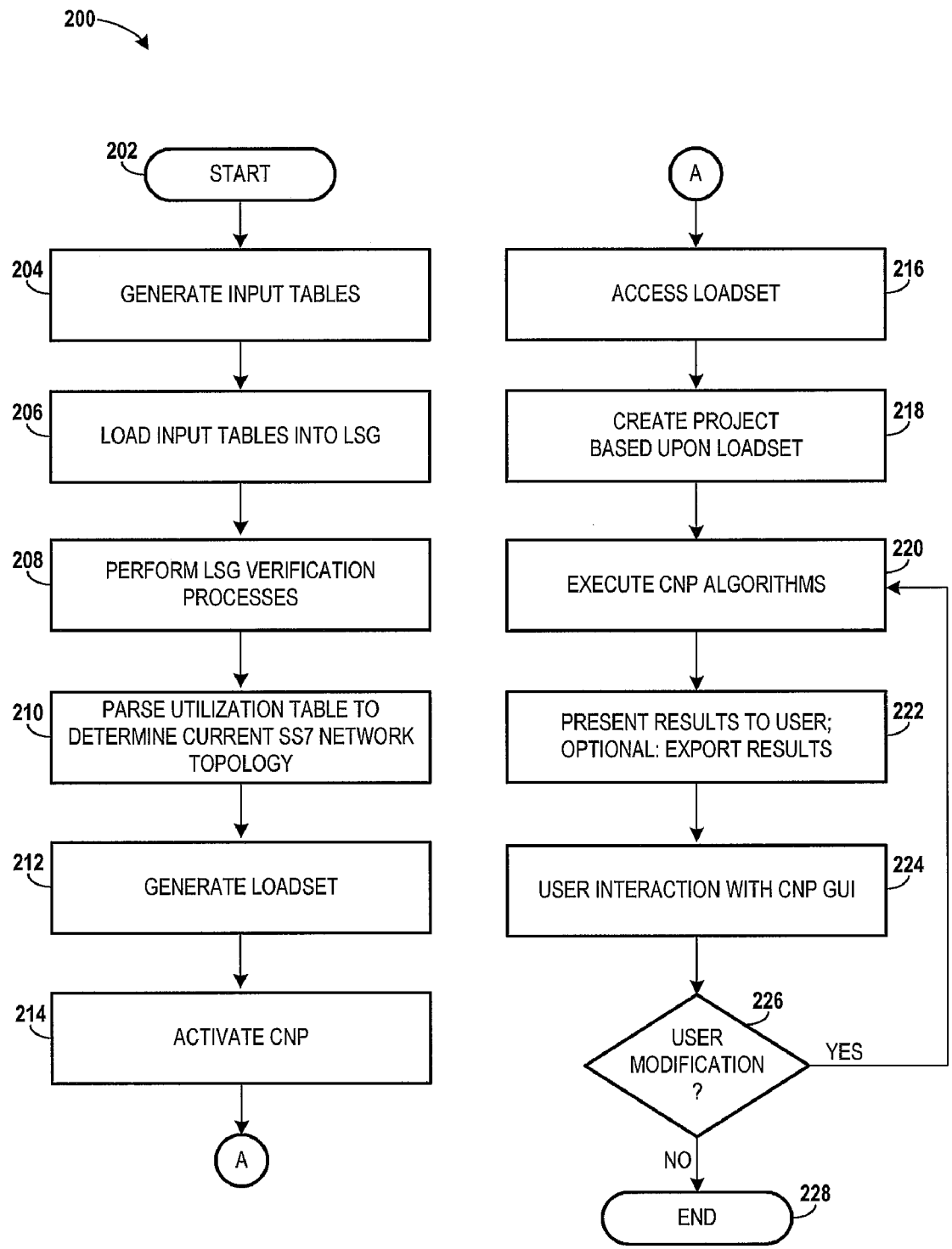
FIG. 2 illustrates an exemplary flow diagram of a method in accordance with various aspects of the present invention.

Referring now to FIG. 2, a flow diagram of an exemplary method 200 is depicted, according to the present invention. It should be understood that the following exemplary method is not limited to the number or order of steps shown.

The method 200 begins at step 202 and proceeds to step 204, wherein the input tables are generated. The input tables can be generated automatically by the data processing system 100 or by another system and transferred to the data processing system 100. The input tables may also be manually generated. After generation of the input tables, the method 200 proceeds to step 206 wherein the input tables are transferred to the SS7 tool 116 and loaded into the LSG 130. At step 208, the LSG 130 performs various verification processes to, for example, confirm the presence of each required input, identify potential logical inconsistencies with the data, and flag any errors or anomalies present in the inputs. At step 210, the LSG 130 parses the utilization table 118. This step allows the SS7 tool 116 to determine the overall configuration of the SS7 network in its current state. The utilization table 118 can be configured to update as often as is necessary to acquire an accurate representation of the SS7 network configuration during a specified time period. This ensures that the most recent and accurate network configuration is used for the generation of a loadset at step 212. After the loadset is generated, the method 200 proceeds to step 214, wherein the CNP component 132 is activated. The CNP component 132 accesses the recently generated loadset, at step 216, and creates a project based upon this loadset, at step 218. This occurs, for example, when a user selects an option on the GUI 136 to create a new project. The CNP algorithms 134 are executed, at step 220. At step 222, the results are presented to a user. In some embodiments, the user may export the results to another device such as a printer, another data processing system, a memory, or another software program. At step 224, the user interacts with the CNP GUI 224. If, at step 226, the user modifies one or more of the input tables, the SS7 tool 116 then re-executes the CNP algorithms 134. If not, the method 200 proceeds to step 228 and the method 200 ends.

Figure 3A:
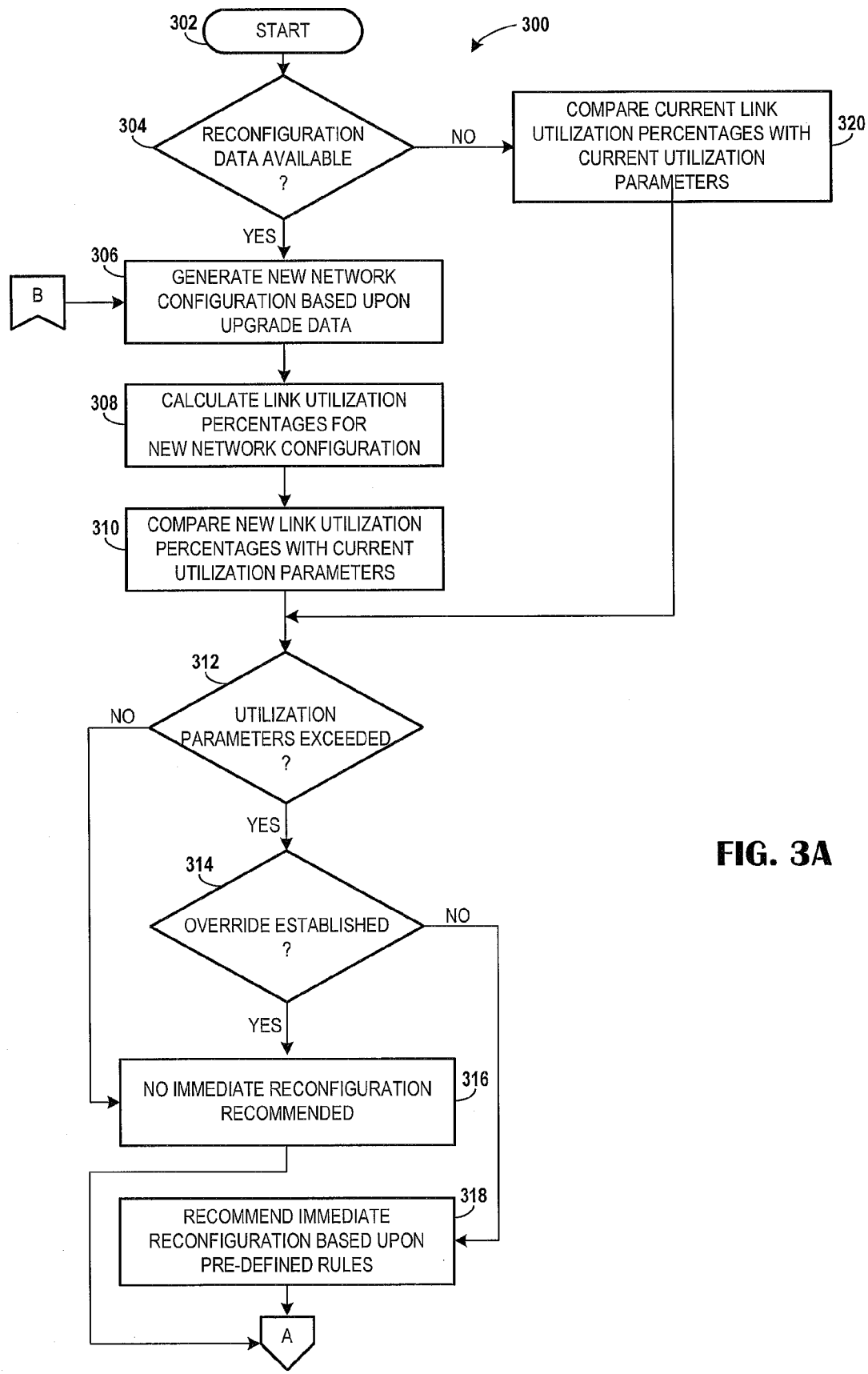
FIGS. 3A and 3B illustrate an exemplary flow diagram of a method for planning and forecasting SS7 network upgrades and/or augmentations in accordance with various aspects of the present invention.

Referring now to FIG. 3A, an exemplary flow diagram of a method 300 for planning and forecasting SS7 network reconfigurations in accordance with various aspects of the present invention is provided. The method 300 begins at step 302 and proceeds to step 304, wherein a decision is made as to whether reconfiguration data is available. Reconfiguration data is provided via the reconfiguration tables 120. It is contemplated that this check can be performed when a project is created or loaded, or when any of the input table information has been updated. If reconfiguration data is available, that is, one or more reconfiguration tables 120 are provided to the SS7 tool 116, then the method 300 proceeds to step 306 wherein a new network configuration is generated based upon the reconfiguration data. The method 300 then proceeds to step 308, wherein link utilization percentages are calculated for the new network configuration. The calculated link utilization percentages are then compared, at step 310, to the current utilization parameters described in the link type utilization table 122.

If reconfiguration data is not available at step 304, the method 300 proceeds to step 320, wherein the current link utilization percentages are compared with the current utilization parameters. After either step 310 or step 320, the method 300 proceeds to step 312, wherein a decision is made as to whether the utilization parameters are exceeded for each link in the new network configuration. If one or more utilization parameters are exceeded, the method 300 proceeds to step 314, wherein a check is performed to determine if an override is established for any of the utilization parameters. If one or more overrides are established, or if no utilization parameters are exceeded in the previous step, the method 300 proceeds to step 316 wherein the SS7 tool 116 determines that no immediate reconfiguration is required and thus no recommendation is made. If no override is established, the method 300 proceeds to step 318 and the SS7 tool 116 recommends an immediate reconfiguration based upon a number of pre-defined rules, for example, rules for the allocation of A, B, C, and D links in accordance with SS7 standards. The method then proceeds to step 322.

Figure 3B:
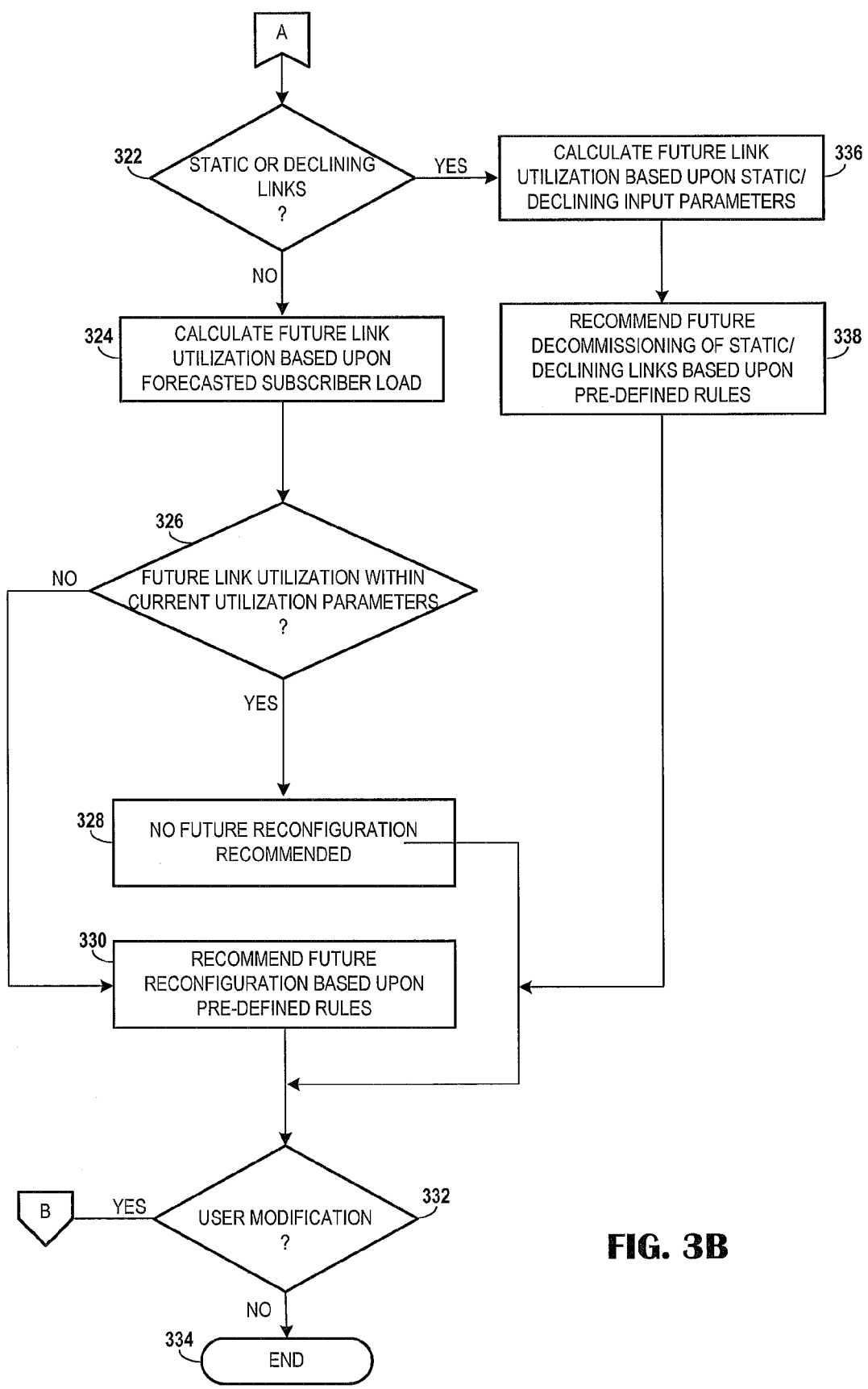

Referring now to FIG. 3B, at step 322, the SS7 tool 116 looks at the static/declining links tables 128. If there are no static or declining links, the method 300 proceeds to step 324 wherein future link utilizations are calculated based upon forecasted subscriber load. This data can be provided by the forecast table 126. The method 300 then proceeds to step 326, wherein a decision is made as to whether the future link utilization is within the current utilization parameters. If the future link utilization is within the current utilization parameters, the method 300 proceeds to step 328 and no future reconfiguration is recommended by the SS7 tool 116. If the future link utilization is not within the current utilization parameters, the SS7 tool 116 recommends a reconfiguration of the SS7 network based upon a number of pre-defined rules, at step 330. The method then proceeds to step 332.

If, at step 322, there is a static or declining link, the method 300 proceeds to step 336 and future link utilizations are calculated based upon the static/declining link input parameters. The method 300 then proceeds to step 338 and the SS7 tool 116 recommends the future decommissioning of the static/declining links based upon pre-defined rules. The method 300 then proceeds to step 332

At step 332, a check is performed to determine if a user modified one or more of the input tables. If one or more of the input tables has been modified, then the method 300 reverts back to step 306 of FIG. 3A and a new network configuration is generated based upon the modification. If not, the method 300 proceeds to step 334 and the method 300 ends.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A method for planning a Signaling System 7 (SS7) network, the method comprising:
   receiving, at a data processing system, pending network reconfiguration plan data, the pending network reconfiguration plan data comprising data regarding pending plans to reconfigure a current network configuration of the SS7 network by deleting, rehoming, or replacing at least one network element of the SS7 network, or adding a network element to the SS7 network;
   generating, at the data processing system, a new network configuration for the SS7 network based upon the pending network reconfiguration plan data, the new network configuration comprising a plurality of network elements;
   calculating, at the data processing system, a new link utilization percentage for each of the plurality of network elements in the new network configuration of the SS7 network;
   comparing, at the data processing system, the new link utilization percentage for each of the plurality of network elements in the new network configuration to current utilization parameters for corresponding network elements of the current network configuration;
   determining, at the data processing system, whether any of the new link utilization percentages for the plurality of network elements in the new network configuration exceed the current utilization parameters for the corresponding network elements of the current network configuration;
   if it is determined, at the data processing system, that any of the current utilization parameters for the corresponding network elements in the current network configuration are exceeded, determining, at the data processing system, whether an override is established for the exceeded current utilization parameter;
   if the override is established for the exceeded current utilization parameter, determining, at the data processing system, to not recommend an immediate reconfiguration of the SS7 network to the new network configuration;
   if there is no override established for any exceeded current utilization parameter, recommending, at the data processing system, the immediate reconfiguration of the SS7 network to the new network configuration; and
   if it is determined, at the data processing system, that none of the current utilization parameters are exceeded, determining, at the data processing system, to not recommend the immediate reconfiguration of the SS7 network to the new network configuration.

2. The method of claim 1, further comprising:
   determining, at the data processing system, whether the current configuration of the SS7 network includes any static or declining links;
   if it is determined that the current configuration of the SS7 network includes at least one static or declining link:
      calculating, at the data processing system, a future link utilization based upon static/declining link input parameters, the static/declining link input parameters defining links that will experience either static or declining usage for a duration of a specified forecasting period; and
      recommending, at the data processing system, future decommissioning of the static or declining link.

3. The method of claim 1, further comprising:
   determining, at the data processing system, whether the current configuration of the SS7 network includes any static or declining links;
   if it is determined that the current configuration of the SS7 network does not include at least one static or declining link:
      calculating, at the data processing system, a future link utilization based upon forecasted subscriber load;
      determining, at the data processing system, whether the future link utilization is within the current utilization parameters;
      if it is determined that the future link utilization is within the current utilization parameters, determining, at the data processing system, to not recommend a future reconfiguration of the SS7 network; and
      if it is determined that the future link utilization is not within the current utilization parameters, recommending, at the data processing system, the future reconfiguration of the SS7 network.

4. A data processing system for planning a Signaling System 7 (SS7) network, the system comprising:
   an input/output (I/O) device;
   a memory configured to store instructions that are executable by a processor;
   the processor, in communication with the memory, the processor being configured to execute the instructions to:
      receive pending network reconfiguration plan data, the pending network reconfiguration plan data comprising data regarding pending plans to reconfigure a current network configuration of the SS7 network by deleting, rehoming, or replacing at least one network element of the SS7 network, or adding a network element to the SS7 network;
      generate a new network configuration for the SS7 network based upon the pending network reconfiguration plan data, the new network configuration comprising a plurality of network elements;
      calculate a new link utilization percentage for each of the plurality of network elements in the new network configuration of the SS7 network;
      compare the new link utilization percentage for each of the plurality of network elements in the new network configuration to current utilization parameters for corresponding network elements of the current network configuration;
      determine whether any of the new link utilization percentages for the plurality of network elements in the new network configuration exceed the current utilization parameters for the corresponding network elements of the current network configuration;
      if it is determined that any of the current utilization parameters for the corresponding network elements in the current network configuration are exceeded, determine whether an override is established for the exceeded current utilization parameter;
      if the override is established for the exceeded current utilization parameter, determine to not recommend an immediate reconfiguration of the SS7 network to the new network configuration;
      if there is no override established for any exceeded current utilization parameter, recommend the immediate reconfiguration of the SS7 network to the new network configuration; and
      if it is determined that none of the current utilization parameters are exceeded, determine to not recommend the immediate reconfiguration of the SS7 network to the new network configuration.

5. The data processing system of claim 4, wherein the memory is further configured to store instructions that are executable by the processor to:
- determine whether the current configuration of the SS7 network includes any static or declining links;
- if it is determined that the current configuration of the SS7 network includes at least one static or declining link:
  - calculate a future link utilization based upon static/declining link input parameters, the static/declining link input parameters defining links that will experience either static or declining usage for a duration of a specified forecasting period; and
  - recommend future decommissioning of the static or declining link.

6. The data processing system of claim 4, wherein the memory is further configured to store instructions that are executable by the processor to:
- determine whether the current configuration of the SS7 network includes any static or declining links;
- if it is determined that the current configuration of the SS7 network does not include at least one static or declining link:
  - calculate a future link utilization based upon forecasted subscriber load;
  - determine whether the future link utilization is within the current utilization parameters;
  - if it is determined that the future link utilization is within the current utilization parameters, determine to not recommend a future reconfiguration of the SS7 network; and
  - if it is determined that the future link utilization is not within the current utilization parameters, recommend the future reconfiguration of the SS7 network.

7. A non-transitory computer-readable memory comprising instructions that, when executed by a processor, make the processor operable to:
- receive pending network reconfiguration plan data, the pending network reconfiguration plan data comprising data regarding pending plans to reconfigure a current network configuration of the SS7 network by deleting, rehoming, or replacing at least one network element of the SS7 network, or adding a network element to the SS7 network;
- generate a new network configuration for the SS7 network based upon the pending network reconfiguration plan data, the new network configuration comprising a plurality of network elements;
- calculate a new link utilization percentage for each of the plurality of network elements in the new network configuration of the SS7 network;
- compare the new link utilization percentage for each of the plurality of network elements in the new network configuration to current utilization parameters for corresponding network elements of the current network configuration;
- determine whether any of the new link utilization percentages for the plurality of network elements in the new network configuration exceed the current utilization parameters for the corresponding network elements of the current network configuration;
- if it is determined that any of the current utilization parameters for the corresponding network elements in the current network configuration are exceeded, determine whether an override is established for the exceeded current utilization parameter;
- if the override is established for the exceeded current utilization parameter, determine to not recommend an immediate reconfiguration of the SS7 network to the new network configuration;
- if there is no override established for any exceeded current utilization parameter, recommend the immediate reconfiguration of the SS7 network to the new network configuration; and if it is determined that none of the current utilization parameters are exceeded, determine to not recommend the immediate reconfiguration of the SS7 network to the new network configuration.

8. The non-transitory computer-readable memory of claim 7, further comprising instructions that, when executed by the processor, make the processor further operable to:
- determine whether the current configuration of the SS7 network includes any static or declining links;
- if it is determined that the current configuration of the SS7 network includes at least one static or declining link: calculate a future link utilization based upon static/declining link input parameters, the static/declining link input parameters defining links that will experience either static or declining usage for a duration of a specified forecasting period; and recommend future decommissioning of the static or declining link.

9. The non-transitory computer-readable memory of claim 7, further comprising instructions that, when executed by the processor, make the processor further operable to:
- determine whether the current configuration of the SS7 network includes any static or declining links;
- if it is determined that the current configuration of the SS7 network does not include at least one static or declining link: calculate a future link utilization based upon forecasted subscriber load;
- determine whether the future link utilization is within the current utilization parameters; if it is determined that the future link utilization is within the current utilization parameters, determine to not recommend a future reconfiguration of the SS7 network; and
- if it is determined that the future link utilization is not within the current utilization parameters, recommend the future reconfiguration of the SS7 network.

* * * * *